United States Patent
Chidananda et al.

(10) Patent No.: US 9,743,252 B2
(45) Date of Patent: Aug. 22, 2017

(54) SYSTEM AND METHOD FOR LOCATING DEVICES IN PREDETERMINED PREMISES

(71) Applicant: Honeywell International Inc., Morristown, NJ (US)

(72) Inventors: Basavani Suresh Chidananda, Bangalore (IN); Sreejith Naarakathil, Bangalore (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 147 days.

(21) Appl. No.: 14/736,502

(22) Filed: Jun. 11, 2015

(65) Prior Publication Data

US 2016/0366562 A1   Dec. 15, 2016

(51) Int. Cl.

| | |
|---|---|
| G08B 1/08 | (2006.01) |
| H04W 4/04 | (2009.01) |
| G08B 21/02 | (2006.01) |
| G08B 21/24 | (2006.01) |
| G01S 5/02 | (2010.01) |
| G01S 5/18 | (2006.01) |
| G01S 5/00 | (2006.01) |
| G01S 5/30 | (2006.01) |
| G01S 11/16 | (2006.01) |

(52) U.S. Cl.
CPC ............ *H04W 4/04* (2013.01); *G01S 5/0054* (2013.01); *G01S 5/0081* (2013.01); *G01S 5/0289* (2013.01); *G01S 5/0294* (2013.01); *G01S 5/18* (2013.01); *G01S 5/30* (2013.01); *G08B 21/0272* (2013.01); *G08B 21/24* (2013.01); *G01S 11/16* (2013.01)

(58) Field of Classification Search
CPC ...... H04W 4/04; G01S 5/0289; G01S 5/0294; G01S 5/18

USPC ..................................... 340/539.32; 367/387
See application file for complete search history.

(56) References Cited

U.S. PATENT DOCUMENTS

| | | | |
|---|---|---|---|
| 8,094,012 B1 | 1/2012 | Tran et al. | |
| 2008/0207067 A1* | 8/2008 | Ricciuti | H04B 10/118 441/11 |
| 2009/0081923 A1* | 3/2009 | Dooley | A63F 9/143 446/456 |
| 2009/0190441 A1 | 7/2009 | Zhao et al. | |
| 2010/0090899 A1* | 4/2010 | Zhao | G01S 5/0252 342/387 |

(Continued)

FOREIGN PATENT DOCUMENTS

WO   WO 97/50065 A1   12/1997

OTHER PUBLICATIONS

Extended European search report for corresponding EP patent application 16171830.9, dated Nov. 2, 2016.

*Primary Examiner* — Ojiako Nwugo
(74) *Attorney, Agent, or Firm* — Husch Blackwell LLP

(57) ABSTRACT

A location tracking system includes a first plurality of signal receiving and transmitting devices, the members of the first plurality each include an RF transceiver, sound receivers and sound emitters. A second plurality of signal transmitting units, the members of the second plurality each include at least an RF transceiver and a sound emitter. A system control element in communication with the members of the first plurality wherein the control element determines the locations of members of the second plurality based, at least in part, on information received from members of the first plurality.

18 Claims, 4 Drawing Sheets

Control Panel/Control unit

Capable of processing location data received from various Type- A devices

DEVICES 12
Tx AND Rx Capable

Type - A
1..m

TxRx: Sound AND RF

(56) References Cited

U.S. PATENT DOCUMENTS

| | | |
|---|---|---|
| 2011/0260859 A1 | 10/2011 | Maurer |
| 2011/0306370 A1 | 12/2011 | Zhao et al. |
| 2013/0279370 A1* | 10/2013 | Eitan .................. G01S 5/0231 370/254 |
| 2014/0283136 A1* | 9/2014 | Dougherty ............. G01S 5/00 726/29 |
| 2015/0156637 A1* | 6/2015 | Li ........................ G01S 1/725 455/454 |
| 2015/0358234 A1* | 12/2015 | Krieger ............... H04W 4/008 709/235 |
| 2016/0227360 A1* | 8/2016 | Huang ............. G06K 7/10366 |
| 2016/0238690 A1* | 8/2016 | Colucci .................. G01S 1/68 |

* cited by examiner

SYSTEM AND METHOD FOR LOCATING DEVICES IN PREDETERMINED PREMISES

FIELD

The application pertains to identification of the location of movable objects in a predetermined region. More particularly, the application pertains to identification systems and methods having a fixed set of devices, whose location is known, and movable units. The movable units interact with the fixed devices and provide position indicating information to those devices.

BACKGROUND

Security systems, such as for homes and businesses, have become commonplace as people seek to protect themselves and their property. Home security systems typically employ sensors at entry points, such as windows and doors, along with interior sensors such as motion detectors, vibration sensors, shock sensors, and glass break sensors.

Commercial security systems include hundreds of detectors, or, sensors connected to a control panel which analyses the sensor data and triggers alarms where there is an intrusion or fire or similar such event. The following are observations as to characteristics of such systems.

There are issues due to misplacing devices/items of interest, for example, keyfobs, mobile phones, locker keys and the like. A mobile phone misplaced for more than an hour can be used to transfer money from a wallet or reset the phone fully so that it cannot be identified. RF fobs if lost, can allow intrusion with valid access to unwanted users. It would then be difficult to avoid such a theft. The occurrence might only be realized much later about the incident.

Safe guarding important assets: Bank offices are commercial premises which have a lot of objects, such as cash or bonds, that have to be safe guarded. Also, the location of people within the bank premises might be important. Only after a theft happens are asset losses realized. At that time, the perpetrators might be identified using video surveillance records.

At times there are cases in homes as well as at commercial premises that the objects of interest have been seripticiously taken away and later are difficult to find or locate. It would be good to track such items to see where they have been moved around within the premises.

It is known that TV remote controls are at times lost in our homes when we require them the most. Several systems exist for locating such devices but none do it accurately enough.

To solve the above issues, one can use GPS systems for locating people if they are carrying handheld devices. But it is still not possible to locate any items of interest within the premises if GPS signals cannot reach the interior locations. And to accurately identify location of devices within premises is still not easily achieved.

DETAILED DESCRIPTION

Figure 1A:
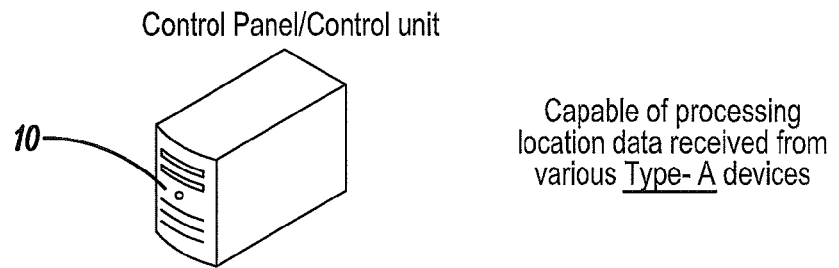
FIGS. 1A, 1B, 1C taken together illustrate symbols used in FIGS. 2, 3.

While disclosed embodiments can take many different forms, specific embodiments hereof are shown in the drawings and will be described herein in detail with the understanding that the present disclosure is to be considered as an exemplification of the principles hereof, as well as the best mode of practicing same, and is not intended to limit the claims hereof to the specific embodiment illustrated.

Unlike prior unsuccessful systems, the system and method hereof intend to solve the problem of identifying the location of devices within the premises and also to track the movement of items/objects of interest. Advantageously, and more over, the solution is low cost since it does not use GPS tracking devices nor does it require a lot of sensors.

In embodiments hereof, at least two different types of devices, or units, interact with one another to generate electrical signals which can be transmitted to determination circuitry. That circuitry can use the received information to establish the position of movable units relative to fixed devices in a predetermined region of interest.

In one aspect, devices can be fixedly positioned in the region of interest.

The devices are each able to transmit and receive the RF and/or sound signals from movable units and process the data. Position data can be transmitted to a control panel, or, central unit for further processing.

The units are small, and movable, like a tag, which can, in one embodiment, emit RF signals, and sound signals at the same time. The unit can emit and/or receive for higher accuracy in position identification and configuration. These signals are to be received by the devices which can process and/or send them to the control unit for further processing. In another aspect, the system processes these signals to locate the units which are attached to an item of interest.

In a disclosed embodiment, in a room/area multiple devices are pre-installed and are waiting to receive signals from the units. All these devices are calibrated/preprogrammed to send the position data of their own location to the control, or, central unit to locate and identify those devices.

A unit can each be fixed or attached to an asset to be tracked/identified or it can be part of the asset. Units emit RF and/or sound signals which are decoded and understood by receiving devices. In another embodiment, the units are capable of receiving and transmitting RF/sound signals to be used for relative tracking of units.

The location data from the units, including signal strength, sound level, difference between sound and RF timing is processed internally by the device(s) and transmitted back to the central control unit, or ,panel for further processing. The central unit, or, panel further processes these inputs from multiple device inputs to identify the location of the units.

In yet another aspect, multiple Type-A devices are installed in a premises or region of interest, and in each partition/room. These Type-A devices can be powered by a security system or self-powered. They are capable of sending information to the control panel or a central unit of the system wirelessly or via a wired medium.

The location of each of the devices is measured and identified using a 3D axis location measurement system. This enables the control panel to locate the Type-A devices. Once the location of Type-A devices is determined, each of the Type-A devices is calibrated/preprogrammed to send location information based on their relative location within the premises to the control unit.

A Type-B unit which is capable of sending sound, audible or ultrasonic, and RF signals to the Type-A devices is placed between these devices for calibration. Based on the signals received from the test device, various locations within the partition/room or relevant region can be identified and mapped by the control unit, or, panel automatically. Once the panel and Type-A devices are calibrated, the system is ready to identify the location of any registered Type-B unit.

In another embodiment where Type-B devices are able to send/receive sound and RF signals, they are able to send relative locations with respect to another Type-B device whose location is already identified by the panel. In this case Type-A devices receive additional positional information from Type-B devices and central panel can do more accurate calculations for determining position.

Advantageously, the RF and sound signals can include encoded data to differentiate various Type-B units which are emitting similar signals. As a result, we can identify multiple Type-B units and track them individually whenever necessary.

The Type-B unit(s) is/are then registered with the control unit, or, security panel and one may attach the Type-B units to items of interest. These units are low power, battery operated devices. Such units transmit RF and sound signals periodically, as programmed, to devices. They can send the location of the attached respective item. The security system devices receive such signals and send the information back to the security panel. The security system calculates the location of various units in the region by an automatic, at least in part circuit implemented, triangulation process.

In yet another aspect, Type-B devices are able to locate their current location from Type-A devices and store in permanent memory. Type-B devices are capable of broadcasting periodically its location information and able to receive such information if instructed. Most of the time, Type-B devices ignore the broadcast messages from its peers until instructed to echo back to Type-A. Control panel/central unit can process all the echoed broadcast messages on need basis to improve the accuracy of location information.

A user can determine the location of an object within the premises, using a mobile app connected to the security panel. The panel can triangulate the location and identify the position of the object in a user readable, or viewable format. The animated location information within the building can be visually presented. Also, if a camera is available, the mobile application can display the location by moving the camera to that location and streaming the image/video to the user's phone via a mobile app.

Figure 1B:
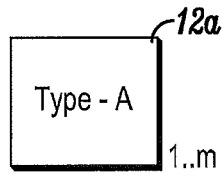
Figure 1C:
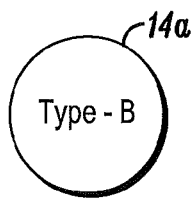
Figure 1C:
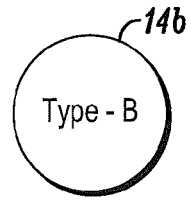
Figure 2:
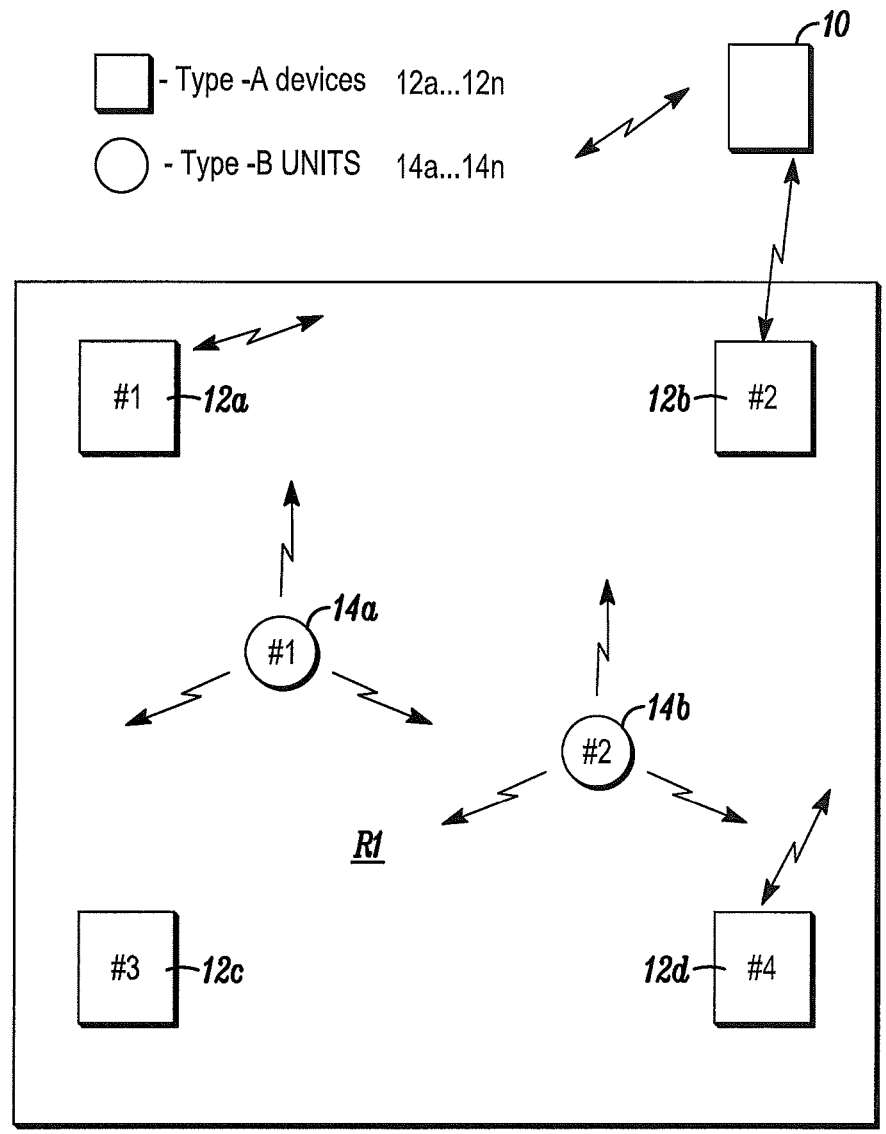
FIG. 2 is a diagram of a first exemplary configuration.
Figure 3:
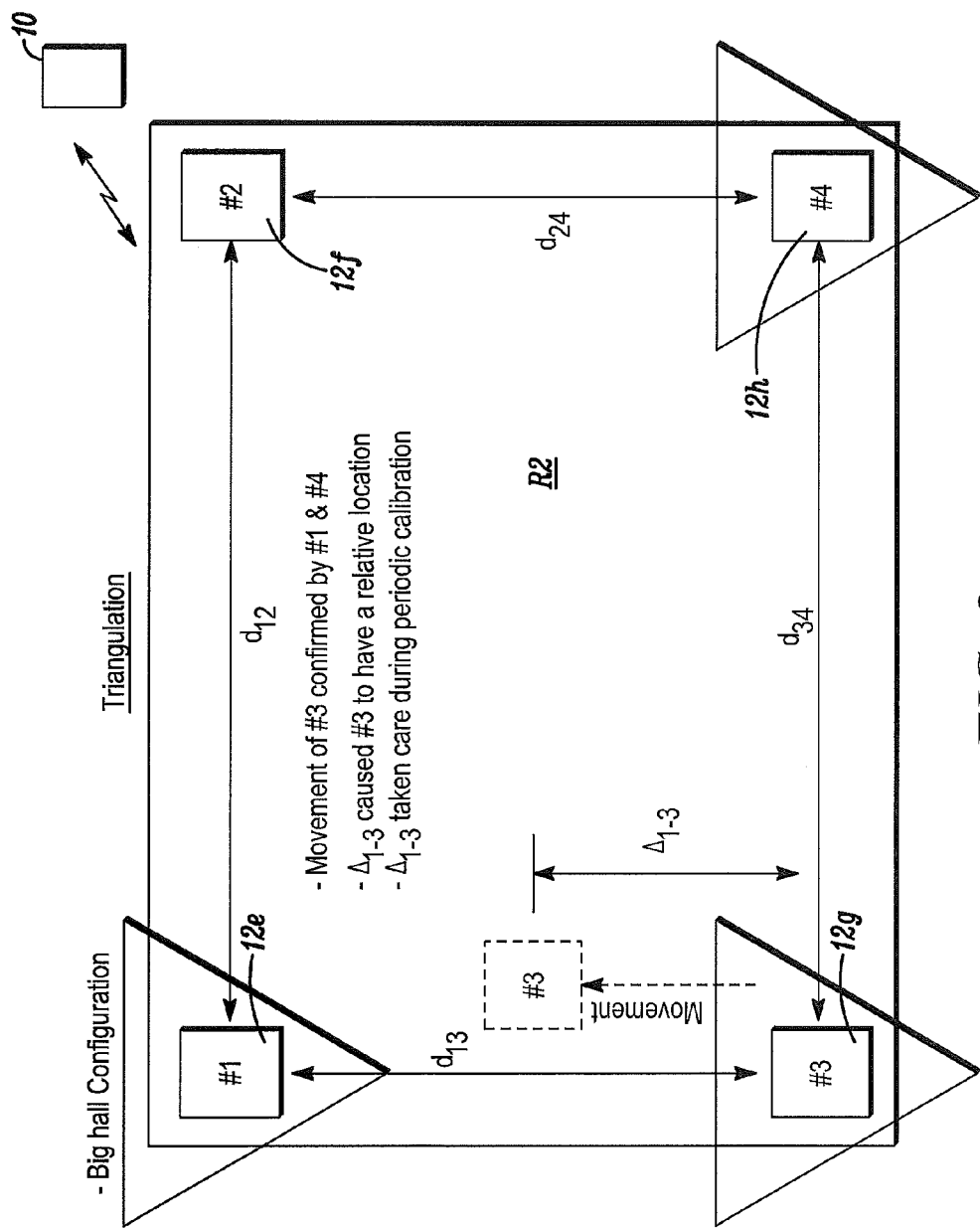
FIG. 3 is a diagram of a second exemplary configuration.

FIGS. 1-3 illustrate aspects of embodiments as discussed above. FIG. 1A illustrates a symbol of a system control unit or control panel 10. FIG. 1B illustrates a symbol of a Type-A device, such as 12a illustrated therein. As discussed below, a region R1, or R2 of interest can be populated with a plurality 12a, 12b, 12c . . . 12m of the fixed devices such as device 12a. FIG. 1C illustrates symbols of movable Type-B units, such as 14a, 14b.

Type-A devices are fixedly installed in a respective region. The control unit 10 communicates therewith and has a record of the fixed locations thereof. Type-B units are mobile and readily moved in the respective region. The Type-B units could be affixed to or incorporated into an article of interest.

Initially, various device locations are established by the central control unit 10 in a Phase 1 Learning process. FIG. 2 illustrates devices 12i and a typical configuration in a secured premises such as region R1. Capabilities of each device are illustrated in FIG. 1B.

Each security device 12i is equipped with sensors to identify location. These devices are located by the installer using a GPS system to provide location of the respective detector, such as 12i, with respect to a reference. Also this data can be connected to a building information model (BIM) if available.

Then the relation of detector 12i locations relative to each other is determined in learning Sensor phase 2. In this regard, devices, such as 12i, transmit RF and sound information which other deices 12i receive to understand the location of near-by devices. This phase primarily identifies the nearness of one device relative to another device in the region of interest.

FIG. 3 illustrates a triangulation mechanism of locating Type-A devices relative to each other. The diagram depicts movement of a Type-A device within the premises and its recalibration. In this way the central unit 10 builds a relation among sensors and their nearness to each other.

Next, ambient audio and RF noise is identified in Phase 3 device learning. This is to identify the amount of noise exiting in the surrounding area and to adjust the references to identify the amount of noise to be removed.

In phase four, in order to start using the location system, a test verification is carried out using a Test Type-B unit. In this regard, the Type-A devices and Type-B units emit chirp-type signals along with RF signals which are used for synchronization and also to send the serial no of the Type-B units. The Type-B unit is moved around within the premises where Type-A devices have been calibrated. These Type-A devices receive the signals (both Audio and RF) from the test unit, and, send the data to central 10 unit for further processing.

Figure 4:
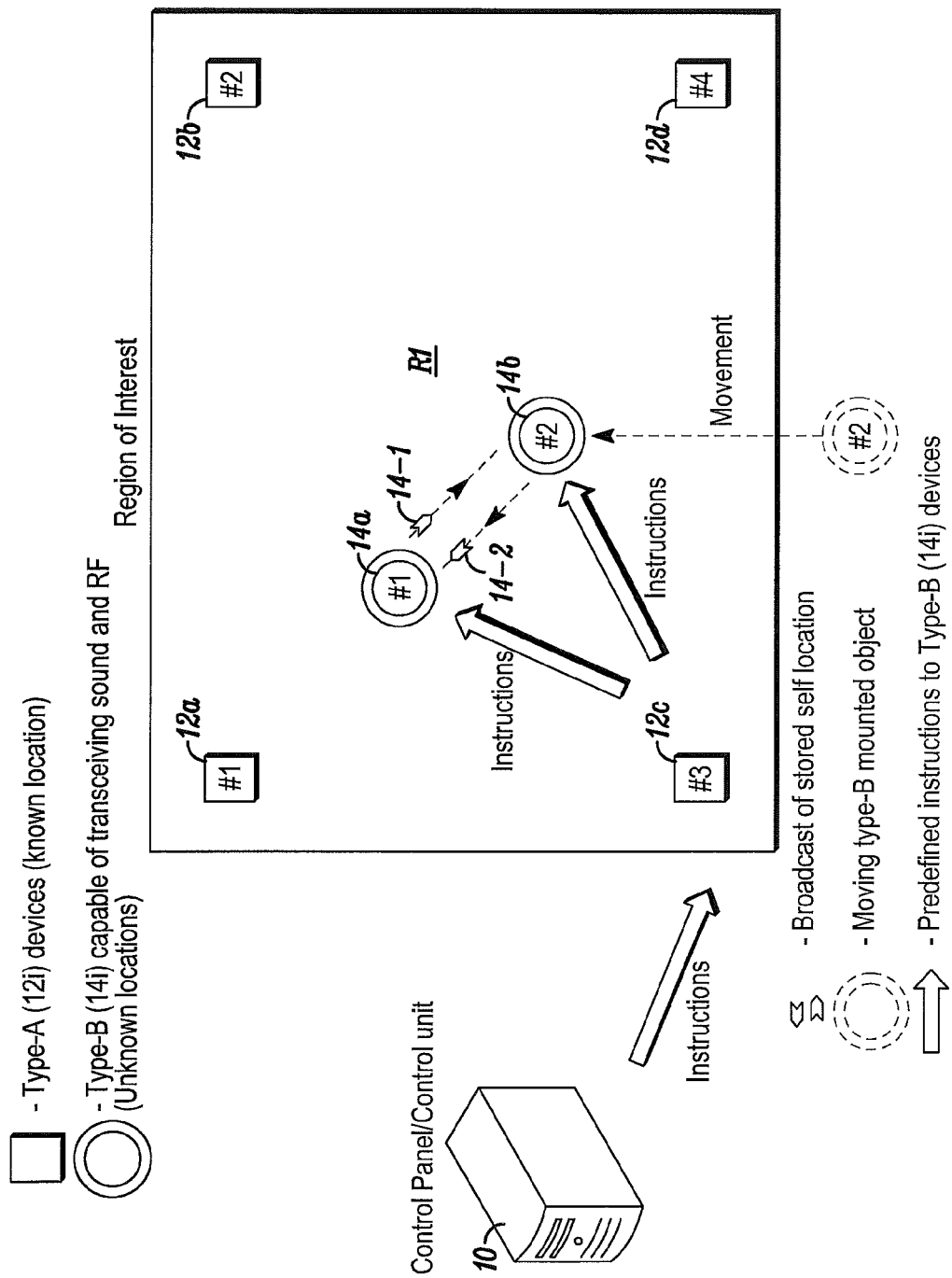
FIG. 4 illustrates additional aspects of an embodiment herein.

With respect to FIG. 4, where Type-A devices 12a, 12b and 12c successfully locate the Type-B unit 14a, the control panel 10 sends the location information back to 14a through one of 12a, 12b or 12c. The Type-B unit 14a stores the location information and broadcasts message 14-1 when directed to do so.

When unit 14b enters secured premises R1, the Type-A devices, such as 12a, 12b, 12c or 12d, obtain an initial location for unit 14b. Additionally, unit 14a receives a broad cast message 14-2 from the unit 14b.

In response to a location request from a user, the control panel 10 identifies R1 as a region of interest and instructs the Type-B units such as 14a, 14b to echo the received broadcast messages from their respective vicinity. The panel 10 can then process all of the echo messages from R1 and determine an accurate position.

Thus, as will be understood by those of skill in the art, Type-B units 14i are able to determine their current locations from the Type-A devices, such as 12i. Also the Type-B units 14i are capable of periodically broadcasting their respective location information and are able to receive such information if directed to do so. In one mode of operation, the Type-B units 14i can ignore the broadcast messages from their peers until instructed to echo back to the Type-A devices, such as 12i. The panel 10 can process all of the echoed broadcast messages on a need to know basis to improve the accuracy of location information.

Relative to the audio signals, the Type-A devices and Type-B units use chirp-type signals for audio. These sound signals can be sent multiple times and also can be emitted with various sounding patterns or encoded data. These patterns help differentiate one object to be identified from the other. Also the devices can be programmed to transmit the degree that the amplitude of the sound exceeds that of the RF data. This device ID can then be used to represent the object of interest such as a keychain or mobile phone or a Vault locker.

The Type-A devices are capable of processing multipath sound signals using standard methods as would be known to those of skill in the art, and need not be discussed further. This is to ensure that the sound phenomena such as echo can be utilized to identify the location of Type-B device.

In an Example, the Type-B unit 14$i$ is attached to a mobile phone. This unit is provided with an identification number which can be easily understood by the central unit 10. Once the mobile phone attached with this unit 14$i$ is in the premises, for example R1, or R2 it periodically transmits RF and sound signals.

When mobile phone is at a fixed location, the devices, such as 12$i$, receive the signal strength and only nearby RF sensors receive the RF signal data. Based on a probabilistic approach the area within which the mobile is present is located. From the sound signals, the distance between each device which received the sound signal can be analyzed. Using a combination of such multiple inputs and processing the same at central unit 10, we can determine the object's location.

The mobile phone location was recorded by central unit when it was fixed. When it is moving, the RF and sound signals will be received by different devices 12$i$. This information is fed to central unit 10 which processes and tracks the movement of such devices. If the object is inside a room or closet where sound attenuation level is high, this is detected by sound attenuation level and based on the mapping of opaque areas, and RF signal received, the object can be identified to be within one of the rooms or closets in a given area.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

Further, logic flows depicted in the figures do not require the particular order shown, or sequential order, to achieve desirable results. Other steps may be provided, or steps may be eliminated, from the described flows, and other components may be add to, or removed from the described embodiments.

The invention claimed is:

1. A system comprising:
a plurality of devices, wherein each of the plurality of devices transmits at least one of a location identifier or location information, and wherein each of the plurality of devices receives RF and sound signals;
a determination element coupled to each of the plurality of devices, wherein the determination element receives the location information transmitted from each of the plurality of devices; and
a plurality of units that transmit identification information,
wherein each of the plurality of devices that receives the identification information from at least one of the plurality of units transmits both the identification information for the at least one of the plurality of units and the location information from a respective one of the plurality of devices to the determination element,
wherein the determination element determines a location of the at least one of the plurality of units relative to the plurality of devices,
wherein the determination element sends the location to the at least one of the plurality of units through the respective one of the plurality of devices, and
wherein the at least one of the plurality of units stores the location.

2. The system as in claim 1 wherein each of the plurality of devices includes hardware so as to be fixedly mounted in a region.

3. The system as in claim 1 wherein the determination element includes storage that specifies the location of each of the plurality of devices.

4. The system as in claim 3 wherein each of the plurality of devices includes a transceiver for communicating with the determination element and each of the plurality of units.

5. The system as in claim 4 wherein each of the plurality of devices includes a source of output sounds and a receiver of incident sounds.

6. The system as in claim 5 wherein each of the plurality of units includes a wireless transceiver for communications with each of the plurality of devices.

7. The system as in claim 6 wherein the determination element includes a control panel for at least one of a monitoring system or a security system.

8. A location tracking system comprising:
a first plurality of signal receiving and transmitting devices, wherein each of the first plurality of signal receiving and transmitting devices includes some of a first RF transceiver, a first sound receiver, or a first sound emitter;
a second plurality of signal transmitting units, wherein each of the second plurality of signal transmitting units includes at least a second RF transmitter and a second sound emitter; and
a system control element in communication with the first plurality of signal receiving and transmitting devices,
wherein the system control element determines a location of at least one of the second plurality of signal transmitting units relative to the first plurality of signal receiving and transmitting devices based on location information transmitted from the first plurality of signal receiving and transmitting devices,
wherein the system control element sends the location to the at least one of the second plurality of signal transmitting units, and
wherein the at least one of the second plurality of signal transmitting units stores the location.

9. The location tracking system as in claim 8 wherein the at least one of the second plurality of signal transmitting units is moving.

10. The location tracking system as in claim 9 wherein the system control element carries out a triangulation method to determine the location of the at least one of the second plurality of signal transmitting units.

11. The location tracking system as in claim 8 wherein each of the first plurality of signal receiving and transmitting devices carries out a triangulation process to determine the location for each of the first plurality of signal receiving and transmitting devices and transmits the location for each of the first plurality of signal receiving and transmitting devices to the system control element.

12. The location tracking system as in claim 11 wherein the system control element includes a data base that includes the location for each of the first plurality of signal receiving and transmitting devices.

13. The location tracking system as in claim 12 further comprising an output device coupled to the system control element to visually present the location for each of the first plurality of signal receiving and transmitting devices.

14. The location tracking system as in claim 8 wherein each of the second plurality of signal transmitting units emits unique coded unit identifying signals.

15. The location tracking system as in claim 14 wherein the system control element includes circuitry to identify and display each of the second plurality of signal transmitting units in response to receiving the unique coded unit identifying signals.

16. A process comprising:
provide a first plurality of signal receiving and transmitting devices;

providing a second plurality of signal transmitting or receiving movable units;

receiving location indicating RF and sound signals from each of the second plurality of signal transmitting or receiving movable units at respective members of the first plurality of signal receiving and transmitting devices;

forwarding the location indicating RF and sound signals to a common location via the respective members of the first plurality of signal receiving and transmitting devices;

determining a location of each of the second plurality of signal transmitting or receiving movable units;

moving a test unit around in a region of interest covered by the first plurality of signal receiving and transmitting devices;

emitting chirping sound signals and RF signals from the test unit;

receiving the chirping sound signals and the RF signals at at least some of the first plurality of signal receiving transmitting devices; and forwarding the chirping in sound signals and the RF signals to the common location for a determination of a location of the test unit relative to the at least some of the first plurality of signal receiving and transmitting devices.

17. The process as in claim 16 further comprising encoding the location indicating RF and sound signals with location and unit identifying indicia.

18. The process as in claim 16 wherein each of the second plurality of signal transmitting or receiving movable units obtain the location of a respective one of the second plurality of signal transmitting or receiving movable units from the at least some of the first plurality of signal receiving and transmitting devices, and wherein each of the second plurality of signal transmitting or receiving movable units stores the location of the respective one of the second plurality of signal transmitting or receiving movable units therein.

* * * * *